(12) United States Patent
Sugimoto

(10) Patent No.: US 11,706,283 B2
(45) Date of Patent: Jul. 18, 2023

(54) USING PREDICTIVE ANALYTICS TO DETERMINE EXPECTED USE PATTERNS OF VEHICLES TO RECAPTURE UNDER-UTILIZED COMPUTATIONAL RESOURCES OF VEHICLES

(71) Applicant: Toyota Motor North America, Inc., Plano, TX (US)

(72) Inventor: Shingo Sugimoto, Frisco, TX (US)

(73) Assignee: Toyota Motor North America, Inc., Plano, TX (US)

( * ) Notice: Subject to any disclaimer, the term of this patent is extended or adjusted under 35 U.S.C. 154(b) by 27 days.

(21) Appl. No.: 16/165,789

(22) Filed: Oct. 19, 2018

(65) Prior Publication Data

US 2020/0128066 A1 Apr. 23, 2020

(51) Int. Cl.
| | |
|---|---|
| *G06F 15/16* | (2006.01) |
| *H04L 67/10* | (2022.01) |
| *H04L 67/12* | (2022.01) |
| *H04L 67/52* | (2022.01) |

(52) U.S. Cl.
CPC .............. *H04L 67/10* (2013.01); *H04L 67/12* (2013.01); *H04L 67/52* (2022.05)

(58) Field of Classification Search
None
See application file for complete search history.

(56) References Cited

U.S. PATENT DOCUMENTS

| | | | |
|---|---|---|---|
| 2007/0008927 A1* | 1/2007 | Herz | ........................ H04L 45/00 370/331 |
| 2009/0177595 A1 | 7/2009 | Dunlap et al. | |
| 2011/0258044 A1* | 10/2011 | Kargupta | ............... G06Q 10/08 705/14.49 |
| 2015/0120087 A1* | 4/2015 | Duan | ...................... H04L 67/12 |
| 2017/0228258 A1* | 8/2017 | Shifman | ................. H04L 67/10 |
| 2017/0257322 A1* | 9/2017 | Nagao | ...................... H04L 67/12 |
| 2018/0063261 A1* | 3/2018 | Moghe | .................... H04L 67/18 |
| 2018/0082590 A1 | 3/2018 | Macineille et al. | |

(Continued)

FOREIGN PATENT DOCUMENTS

| | | |
|---|---|---|
| CN | 103995749 B | 6/2017 |
| DE | 102014225593 A1 | 6/2016 |

(Continued)

OTHER PUBLICATIONS

Castle, Lori, Connected cars may soon become edge data centers, https://360.here.com/2017/06/01/connected-cars-maysoon-become-edge-data-centers/.

(Continued)

*Primary Examiner* — Phyllis A Book
(74) *Attorney, Agent, or Firm* — Dinsmore & Shohl LLP

(57) ABSTRACT

A distributed computing network includes one or more vehicles, each vehicle configured to act as a node in the distributed computing network, and a remote server including a processor and a memory module storing one or more non-transient processor-readable instructions that when executed by the processor cause the remote server to establish a data connection with the one or more vehicles, predict a pattern-of-use of the one or more vehicles, determine a predicted current use of the one or more vehicles, and allocate a computational task to the one or more vehicles based on the predicted pattern-of-use and the predicted current use.

23 Claims, 4 Drawing Sheets

(56) References Cited

U.S. PATENT DOCUMENTS

| | | | | |
|---|---|---|---|---|
| 2018/0211541 | A1* | 7/2018 | Rakah | G06Q 50/30 |
| 2018/0348772 | A1* | 12/2018 | Stefan | G01C 21/3438 |
| 2018/0350023 | A1* | 12/2018 | Devries | G06Q 50/30 |
| 2019/0079659 | A1* | 3/2019 | Adenwala | G06F 3/04842 |
| 2019/0219972 | A1* | 7/2019 | Gray | B25J 9/1602 |
| 2019/0308510 | A1* | 10/2019 | Beaurepaire | B60K 37/02 |

FOREIGN PATENT DOCUMENTS

| | | | | |
|---|---|---|---|---|
| DE | 102017201789 B4 * | 3/2021 | | H04L 47/783 |
| WO | 2018109438 A1 | 6/2018 | | |

OTHER PUBLICATIONS

Althauser, Joshua, Tesla S Owner Uses Their Car to Mine Bitcoin; https://cointelegraph.com/news/tesla-s-owner-uses-theircar-to-mine-bitcoin.

* cited by examiner

USING PREDICTIVE ANALYTICS TO DETERMINE EXPECTED USE PATTERNS OF VEHICLES TO RECAPTURE UNDER-UTILIZED COMPUTATIONAL RESOURCES OF VEHICLES

TECHNICAL FIELD

The present specification generally relates to recapturing under-utilized computational resources and, more specifically, using predictive analytics to determine expected use patterns of vehicles to recapture under-utilized computational resources of vehicles.

BACKGROUND

It can be difficult to predict the availability of computational resources in an ad hoc grid network. This difficulty may be due to the inability to predict when computational resources may be powered on, connected to a network, and available to actively process. Further, computational resources that are on a network participating in computational processes may drop from the network at any time, increasing latency and requiring redistribution of computational tasks throughout the network. When the computational resources are vehicle-based, the difficulty of distributing computational tasks is magnified based on mobility. Accordingly, systems and methods for using predictive analytics to determine expected use patterns of vehicles to recapture under-utilized computational resources of vehicles may be required.

SUMMARY

In one embodiment, a distributed computing network includes one or more vehicles, each vehicle configured to act as a node in the distributed computing network, and a remote server including a processor and a memory module storing one or more non-transient processor-readable instructions that when executed by the processor cause the remote server to establish a data connection with the one or more vehicles, predict a pattern-of-use of the one or more vehicles, determine a predicted current use of the one or more vehicles, and allocate a computational task to the one or more vehicles based on the predicted pattern-of-use and the predicted current use.

In another embodiments, a vehicle configured to act as a node in a distributed computing network includes network interface hardware, a processor, and a memory module storing non-transient processor-readable instructions that when executed by the processor cause the vehicle to establish a communicative connection with a remote server, predict a pattern-of-use, predict a current use, transmit the predicted pattern-of-use and the predicted current use to the remote server, and receive a computational task from the remote server based on the predicted pattern-of-use and the predicted current use.

In yet another embodiment, a method of allocating computational tasks in a distributed computing network including a remote server communicatively coupled between a grid computing network and one or more vehicles acting as nodes in the network, includes establishing, by the remote server, a data connection with the one or more vehicles, predicting, by the remote server, a pattern-of-use of the one or more vehicles, predicting, by the remote server, a current use of the one or more vehicles, and allocating, by the remote server, a computational task to the one or more vehicles based on the predicted pattern-of-use and the predicted current use.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles include computational resources, such as central processing units (CPUs) or graphics processing units (GPUs) as components in an electronic control unit (ECU). These computational resources may be under-utilized or completely unutilized when the vehicle is not in operation. Additionally, vehicles may tend to operate on a relatively predictable schedule within a relatively small radius in a single geographic locale. That is, users of vehicle may tend to use the vehicle for the same type of travel each day (e.g., a morning commute) within a particular area at relatively consistent times. Thus, computational infrastructure within that geographic locale, may be leveraged to communicate with a vehicle and to determine a predictable pattern-of-use for the vehicle overtime. In turn, intelligent algorithms can be used to establish predictions regarding the utilization of computational resources. These predictions can be used to efficiently assign computational tasks.

Figure 1:
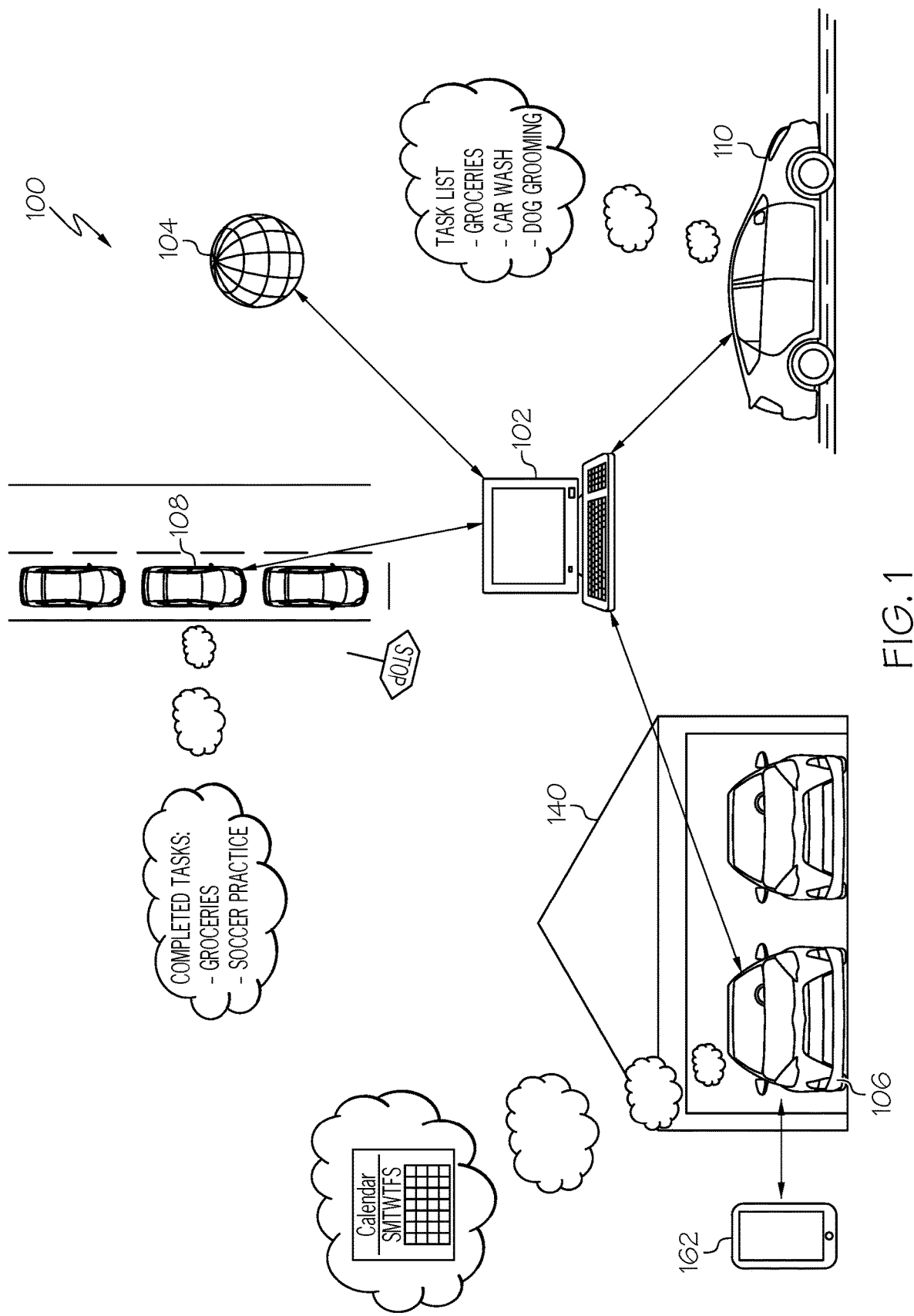
FIG. 1 depicts a distributed computing network including a remote server and multiple nodes, according to one or more embodiments shown and described herein.

Referring generally to FIG. 1, a distributed computing network including a remote server that is communicatively coupled to multiple nodes is shown. Each node in FIG. 1 is a vehicle that includes an electronic control unit including a processor and a memory module that stores a computer-readable instruction set. The remote server may allocate computational tasks to each of the multiple nodes based on various criteria. For example, the remote server may allocate computational tasks to the nodes based on expected computational resource utilization of the node. In some embodiments, the expected computational resource utilization may be determined based on a predicted pattern-of-use of the vehicle and a predicted current use of the vehicle. A pattern-of-use of the vehicle may be determined by collecting data related to, among other things, the day-to-day use of the vehicle. The current use may be predicted based on, among other things, the predicted pattern-of-use, the current time of day, and the location of the vehicle. Instructions that cause the vehicle and/or the remote server to predict a pattern-of-use and a current use of the vehicle may be stored in a memory module of the vehicle and/or the remote server. The remote server may allocate computational tasks based on the predicted pattern-of-use and the predicted current use to accomplish computational tasks assigned by the grid network efficiently to recapture underutilized vehicle-based computational resources.

Referring now to FIG. 1, a distributed computing system 100 is shown. The distributed computing system 100 includes a remote server 102 that is communicatively connected to a grid computing network 104. The remote server 102 may be an edge computing device. The remote server 102 is itself a node in the distributed computing system and is communicatively coupled with multiple other nodes. In the particular example depicted in FIG. 1, the remote server 102 is connected to three nodes: a first vehicle 106; a second vehicle 108; and a third vehicle 110. While the particular embodiment shown in FIG. 1 includes three vehicles, it is to be understood that other embodiments may include a different number of vehicles. Each vehicle includes a vehicle-borne processor as described in greater detail herein. The first vehicle 106, the second vehicle 108, and the third vehicle 110 (collectively, "the vehicles") may execute one or more computer-readable instruction sets to predict a pattern-of-use of the vehicles (individually or in the aggregate) and to predict a current use. The pattern-of-use and the current use may be used to allocate computational tasks to the vehicles.

The grid computing network 104 may be any type or number of computing devices engaged in common computational tasks. For example, the grid computing network 104 may be engaged in mining cryptocurrency or scientific modeling, simulation, and/or calculation. In some embodiments, the grid computing network 104 may include many loosely coupled computers each processing one or more portions of common computational tasks. Each of the nodes (e.g., the remote server 102 and/or the first vehicle 106, the second vehicle 108, the third vehicle 110, etc.) in the grid computing network 104 may be a complete computer with an onboard CPU, storage, power supply, and a network interface. The computing devices in the grid computing network 104 may be members of multiple administrative domains, enabling an inter-administrative domain computing regime.

The remote server 102 may be a server dedicated to coupling the one or more nodes (e.g., the first vehicle 106, the second vehicle 108, the third vehicle 110, etc.) and/or processing data generated and/or transmitted by the one or more nodes. In some embodiments, the remote server 102 may be a roadside unit (RSU) and/or a dedicated short-range communications (DSRC) device. The remote server 102 may allow the nodes to access the grid computing network 104. Accordingly, the remote server 102 may allocate computational resources and tasks to each of the nodes within the grid computing network 104. In some embodiments, the remote server 102 may perform some computation itself and may be considered a supernode. In other embodiments, the remote server 102 may merely serve as a conduit and allocation resource for the grid computing network 104 and the vehicles.

Each of the first vehicle 106, the second vehicle 108, and the third vehicle 110 is a node in the grid computing network 104. Each node uses a computing device (e.g., a CPU, GPU, etc.) that is attached to the grid computing network 104 and is capable of creating, receiving, or transmitting information over a communications channel as will be described in greater detail herein. In some embodiments, each of the first vehicle 106, the second vehicle 108, and the third vehicle 110 may be an end node. However, embodiments are contemplated in which one or more of the vehicles is itself a remote server with similar functionality as the remote server 102. That is, one or more of the first vehicle 106, the second vehicle 108, and the third vehicle 110 may communicatively couple directly with the grid computing network 104 and/or assign computational tasks and/or predict patterns-of-use and current use of the others of the first vehicle 106, the second vehicle 108, and the third vehicle 110.

Figure 2:
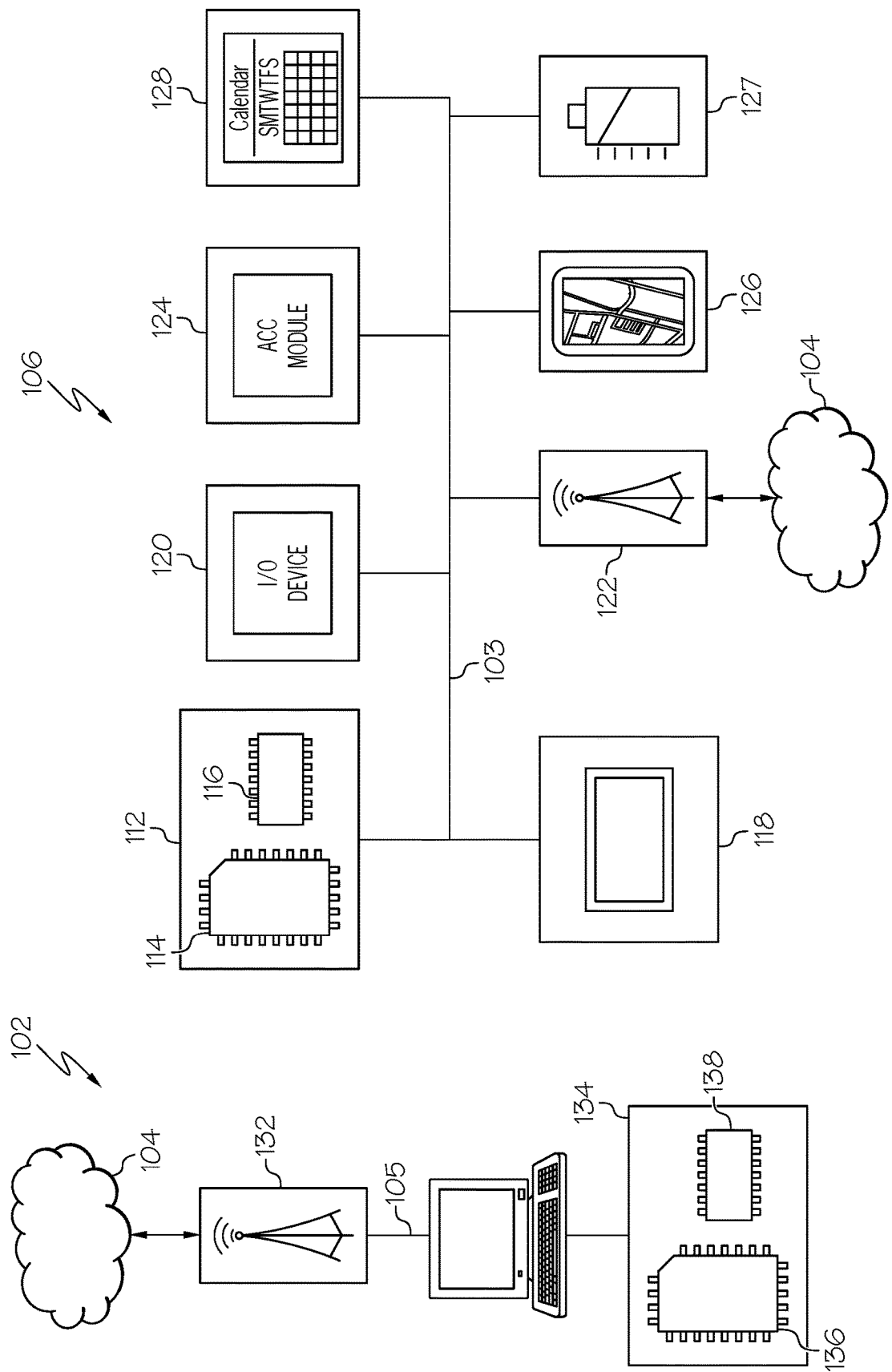
FIG. 2 depicts a schematic illustration of a remote server and a network node, according to one or more embodiments shown and described herein.

Referring to FIG. 2, components of each of the first vehicle 106 and the remote server 102 are schematically depicted. While only the first vehicle 106 is depicted, it is to be understood that each of the second vehicle 108 and the third vehicle 110 of FIG. 1 may include at least the same components as the components depicted with respect to the first vehicle 106. The first vehicle 106 includes a communication path 103 that connects an electronic control unit (ECU) 112 including a processor 114 and a memory module 116, a display 118, an input/output device 120, network interface hardware 122, an adaptive cruise control module 124, a navigation module 126, a calendar module 128, and a battery module 127. The remote server 102 may include network interface hardware 132 and a control unit 134 including a processor 136 and a memory module 138 that are communicatively coupled by a communication path 105.

The ECU 112 may be any device or combination of components comprising a processor 114 and a memory module 116. The memory module 116 may be a non-transitory computer-readable memory that stores one or more computer-readable instruction sets. The processor 114 may be any device capable of executing the computer-readable instruction sets stored in the memory module 116. Accordingly, the processor 114 may be an electric controller, an integrated circuit, a microchip, a computer, or any other computing device. The processor 114 is communicatively coupled to other components by the communication path 103. Accordingly, the communication path 103 may communicatively couple any number of processors with one another, and allow the components coupled to the communication path 103 to operate in a distributed computing environment. Specifically, each of the components may operate as a node that may send and/or receive data. While the embodiment depicted in FIG. 2 includes a single processor 114, other embodiments may include more than one processor.

The memory module 116 is coupled to the communication path 103 and communicatively coupled to the processor 114. The memory module 116 may comprise RAM, ROM, flash memories, hard drives, or any non-transitory memory device capable of storing computer-readable instructions such that the computer-readable instructions can be accessed and executed by the processor 114. The computer-readable instruction set may comprise logic or algorithm(s) written in any programming language of any generation (e.g., 1GL, 2GL, 3GL, 4GL, or 5GL) such as, for example, machine language that may be directly executed by the processor 114, or assembly language, object-oriented programming (OOP), scripting languages, microcode, etc., that may be compiled or assembled into machine readable instructions and stored in the memory module 116. Alternatively, the computer-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single memory module 116, other embodiments may include more than one memory module.

The first vehicle 106 may further include the display 118 for providing visual output such as, for example, maps, navigation, entertainment, information, or a combination thereof. The display 118 may be coupled to the communication path 103. Accordingly, the communication path 103 communicatively couples the display 118 to other modules or components of the first vehicle 106. In some embodiments, the display 118 may include any medium capable of transmitting an optical output such as, for example, a cathode ray tube, light emitting diodes, a liquid crystal display, a plasma display, or the like. In some embodiments, the display 118 may be integrated into one or more of the other components, e.g., the navigation module 126.

The first vehicle 106 may further include the input/output device 120, such as a touch screen, monitor, keyboard, mouse, etc. In some embodiments, the first vehicle 106 may be communicatively coupled with a portable electronic device (e.g., smartphone, tablet, etc.) of a user of the first vehicle 106 that is configured to act as the input/output device 120 of the first vehicle 106. The input/output device 120 may be capable of displaying one or more text-based messages or images or series of images (e.g., video) to communicate a message or other information to the user of the vehicle. A user of the first vehicle 106 may input information to the first vehicle 106 using the input/output device 120. The input/output device 120 may be any device capable of transforming mechanical, optical, or electrical signals into a data signal capable of being transmitted with the communication path 103. The input/output device 120 may include any number of movable objects that each transform physical motion into a data signal that can be transmitted to over the communication path 103 such as, for example, a button, a switch, a knob, a microphone or the like.

In some embodiments, the display 118 and the input/output device 120 may be combined as a single module and operate as or in conjunction with an infotainment system. However, it is noted, that the display 118 and the input/output device 120 may be separate from one another and operate as a single module by exchanging signals via the communication path 103.

The network interface hardware 122 may be coupled to the communication path 103 and communicatively coupled to the ECU 112. The network interface hardware 122 may be any device capable of transmitting and/or receiving data via a network, such as the grid computing network 104. Accordingly, network interface hardware 122 can include a communication transceiver for sending and/or receiving any wired or wireless communication. For example, the network interface hardware 122 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 122 includes hardware configured to operate in accordance with the Bluetooth wireless communication protocol. In another embodiment, network interface hardware 122 may include a Bluetooth send/receive module for sending and receiving Bluetooth communications to/from the grid computing network 104.

The adaptive cruise control module 124 may provide vehicle speed control to the first vehicle 106 based on the distance to a preceding vehicle in traffic. That is, if the first vehicle 106 is not directly behind (e.g., behind and in the same lane) another vehicle, the adaptive cruise control module 124 may maintain the vehicle at a selected speed up to a certain level (e.g., 55 miles per hour). The selected speed may be based on a user input When the first vehicle 106 is directly behind another vehicle, the adaptive cruise control module 124 may maintain the first vehicle 106 at the selected speed subject to maintaining the first vehicle 106 an adjustable distance behind the other vehicle. That is, the first vehicle 106 will not reach the selected speed if the other vehicle is directly in front of the first vehicle 106 and going slower than the selected speed. The adjustable distance may be adjusted to control the distance between the first vehicle 106 and the other vehicle when the other vehicle is traveling less than the selected speed (e.g., close, medium, or far distances). The adaptive cruise control module 124 may be executable as one or more computer-readable instruction sets that, when executed by a processor (e.g., the processor 114) cause the first vehicle 106 to perform as described above. The functions of the adaptive cruise control module 124 may be implemented as one or more computer-readable instruction sets stored in the memory module 116 that cause the first vehicle 106 to maintain the selected speed subject to the restrictions described above when executed by the processor 114.

The adaptive cruise control module 124 and other modules may be critical systems. Critical systems may be systems and/or modules that require relatively large computational resources to operate. Accordingly, the first vehicle 106 may have relatively fewer computational resources to perform one or more assigned tasks while operating critical systems. The status of critical systems may be separately monitored and/or separately reported to the remote server 102 such that the remote server 102 can make a determination as to whether or not to assign a computational task to the first vehicle 106 based on the status of the critical systems.

The navigation module 126 may generate and/or display positional information of the first vehicle 106. The navigation module 126 may be able to obtain and update positional information based on geographical coordinates, i.e. latitudes and longitudes, or via electronic navigation where the navigation module 126 electronically receives positional information through satellites. In certain embodiments, the navigation module 126 may be a GPS system. In some embodiments, the navigation module 126 may maintain a log of all the coordinates traveled by the vehicle as well as maintain a log as to the frequency of travel, including times and dates, to those specific coordinates. In some embodiments, the coordinates may be correlated with a business that exists at the coordinates or an activity that routinely takes place at the coordinates. For example, the navigation module 126 may include computer-readable instructions that cause the navigation module 126 to associate a current position of the vehicle with a particular type of activity (e.g., a gas station for filling up a gas tank of the vehicle, a soccer field for attending soccer practice, etc.). The functions of the navigation module 126 may be implemented as one or more computer-readable instruction sets stored in the memory module 116 that, when executed by a processor (e.g., the processor 114) cause the first vehicle 106 to perform as described above.

The calendar module 128 may track (i.e., record and process data) appointments, recurring events, and/or behavioral patterns of a user or users of the first vehicle 106. The calendar module 128 may track communications to and from a user or users of the first vehicle 106 that include information about appointments and behavioral patterns of the user or users. The calendar module 128 may measure and record average travel times (including departure and arrival times), wait times, and/or idle times for the first vehicle 106. In embodiments in which the first vehicle 106 is an electric vehicle, the first vehicle 106 may measure average battery charge times. In embodiments, the calendar module 128 may display and/or communicate appointments and appointment updates to the user or users and suggest and create appointments based on routine behaviors and patterns-of-life of the user or users of the first vehicle 106. In some embodiments, the calendar module 128 may scrape user communications and automatically generate appointments and/or appointment updates. For example, the calendar module 128 may be configured to access a web-based mail server of the user or users and may access the web-based mail server to automatically populate the calendar of a user or users. The functions of the calendar module 128 may be implemented as one or more computer-readable instruction sets stored in the memory module 116 that, when executed by a processor (e.g., the processor 114) cause the first vehicle 106 to perform as described above.

The battery module 127 may include a vehicle battery and supporting systems. The vehicle battery may include a plurality of battery cells, for example, lithium ion battery cells. The battery module 127 may monitor a battery voltage and use rate of the vehicle battery. In some embodiments, the battery module 127 may provide data about the vehicle battery to the ECU 112 and/or the remote server 102. The data about the battery may be used to allocate one or more computational tasks as described in greater detail herein. In some embodiments, the battery module 127 may be a critical system.

The remote server 102 may include the control unit 134, which includes the processor 136 and the memory module 138, and the network interface hardware 132. The communication path 105 may communicatively couple the components of the remote server 102. The control unit 134 may be any device or combination of components comprising a processor 136 and a memory module 138. The memory module 138 may be a non-transitory computer readable memory. The processor 136 may be any device capable of executing the computer-readable instruction set stored in the memory module 138. Accordingly, the processor 136 may be an electric controller, an integrated circuit, a microchip, a computer, or any other computing device. The processor 136 is communicatively coupled to the other components by the communication path 105. Accordingly, the communication path 105 may communicatively couple any number of processors with one another, and allow the components coupled to the communication path 105 to operate in a distributed computing environment. Specifically, each of the components may operate as a node that may send and/or receive data. While the embodiment depicted in FIG. 2 includes a single processor 136, other embodiments may include more than one processor.

The memory module 138 is coupled to the communication path 105 and communicatively coupled to the processor 136. The memory module 138 may comprise RAM, ROM, flash memories, hard drives, or any non-transitory memory device capable of storing computer-readable instructions such that the computer-readable instructions can be accessed and executed by the processor 136. The computer-readable instruction set may comprise logic or algorithm(s) written in any programming language of any generation (e.g., 1GL, 2GL, 3GL, 4GL, or 5GL) such as, for example, machine language that may be directly executed by the processor 136, or assembly language, object-oriented programming (OOP), scripting languages, microcode, etc., that may be compiled or assembled into machine readable instructions and stored in the memory module 138. Alternatively, the computer-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single memory module 138, other embodiments may include more than one memory module.

The network interface hardware 132 may be coupled to the communication path 105 and communicatively coupled to the control unit 134. The network interface hardware 132 may be any device capable of transmitting and/or receiving data via a network, such as the grid computing network 104. Accordingly, network interface hardware 132 can include a communication transceiver for sending and/or receiving any wired or wireless communication. For example, the network interface hardware 132 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 132 includes hardware configured to operate in accordance with the Bluetooth wireless communication protocol. In another embodiment, network interface hardware 132 may include a Bluetooth send/receive module for sending and receiving Bluetooth communications to/from the grid computing network 104.

Figure 3:
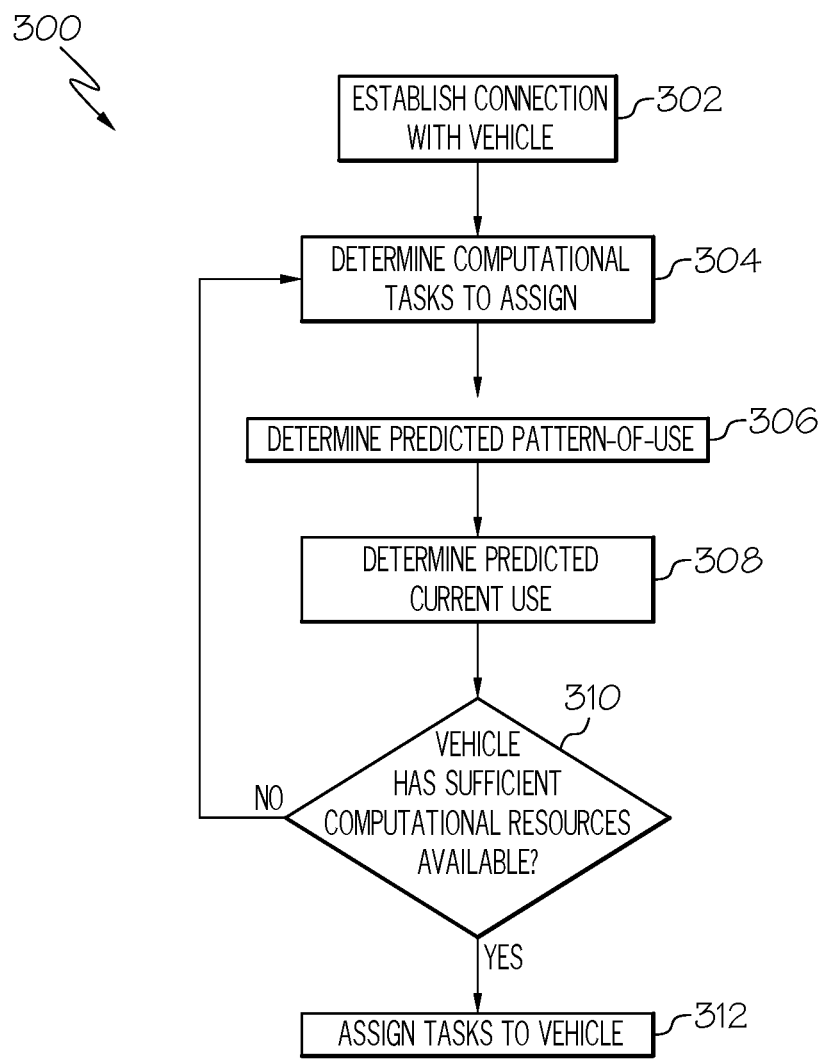
FIG. 3 depicts a flow chart for distributing computational tasks within a network including a remote server and multiple nodes, according to one or more embodiments shown and described herein.

Referring now to FIGS. 1 and 3, a method 300 for using a remote server, such as the remote server 102, to assign computational tasks to vehicles, such as the first vehicle 106, the second vehicle 108, and the third vehicle 110 is described. It is to be understood that the method 300 is not limited to the particular steps or order of steps described in FIG. 3 and that embodiments are contemplated that omit one or more of the steps described herein or that include one or more additional or alternative steps.

At step 302, the remote server 102 may establish a data connection with a vehicle. In embodiments, the data connection may be a vehicle-to-infrastructure ("V2I") or a vehicle-to-vehicle ("V2V") connection. With reference to FIG. 1, whether or not any of the first vehicle 106, the second vehicle 108, and the third vehicle 110 establish a connection with the remote server 102 may be based on a number of factors, for example, proximity (e.g., based on a broadcast strength or a connection signal strength between the vehicles and the remote server 102), a network protocol, security protocols, administrative privileges, etc. In some embodiments, the remote server 102 may routinely send out requests to connect to vehicles in a particular network (e.g., based on a make and/or model of vehicle) or within a particular proximity of the remote server (e.g., a broadcast radius of the network interface hardware 132 of the remote server 102) and may connect to vehicles that accept the request.

At step 304, the remote server 102 determines the computational tasks to assign. The remote server 102 may determine which computational tasks to assign based on which vehicles are in communication with the remote server 102 and the computational resources available with respect to each vehicle. For example, with reference to FIG. 1, the first vehicle 106, the second vehicle 108, and the third vehicle 110 may be in communication with the remote server 102 via their respective network interface hardware 122. Accordingly, the remote server 102 may recognize that it can assign one or more tasks to each of the first vehicle 106, the second vehicle 108, and the third vehicle 110. Based on particular characteristics of the vehicles, the remote server 102 may assign various computational tasks.

In some embodiments, the remote server 102 may determine computational tasks based on the computational task requirements of the grid computing network 104. The grid computing network 104 may have one or more computational tasks in a cue and individual network servers such as the remote server 102 may compare available computational resources (e.g., which vehicles are connected to the remote server 102 and what resources are available on each vehicle) against the computational task. The remote server 102 may then inform the grid computing network 104 that the remote server 102 does or does not have the potential resources to perform the computational task and the grid computing network 104 may assign the computational task to the remote server 102. Some tasks performed by individual computational resources (e.g., the first vehicle 106, etc.) may be perpetual without strict beginning and ending requirements and the remote server 102 may assign such tasks immediately upon notification that computational resources are available. For example, the mining of cryptocurrency may be a perpetual computational task.

At step 306, the remote server 102 may determine a predicted pattern-of-use of the vehicles connected to the remote server 102. The predicted pattern-of-use is a prediction of the future habits of a vehicle based on the observed actions of the vehicle over a given period of time. To determine the predicted pattern-of-use, the remote server 102 may use a variety of statistical techniques from data mining, predictive modelling, and machine learning, that analyze currently scheduled items and historical items to make predictions about the future pattern-of-use. In some embodiments, the remote server 102 may use one or more machine learning infrastructures or techniques, such as neural networks, multi-layer perception, radial basis functions, and geospatial predictive modeling to generate a predicted pattern-of-use. The remote server 102 may use predictive analytics to develop a probability that an individual vehicle (e.g., the first vehicle 106, etc.) will behave in a particular manner based on, among other factors, an historic pattern-of-use, data from the calendar module 128, and/or data from the navigation module 126, such as data regarding locations the vehicle has visited in the past.

For example, as the vehicle operates each day, the navigation module 126 and the calendar module 128 may collect information such as the times and locations of operation of the first vehicle 106. Over time, the data may be processed and averaged to develop a predicted pattern-of-use. For example, the first vehicle 106 may start every weekday at 7:45 AM to drive its user to work. The navigation module 126 and the calendar module 128 may record this data each day and it may be sent to the remote server 102. Later, the first vehicle 106 may drive from work back home at 5:30 PM each day and remain in a garage 140 from 6:00 PM until the next morning at 7:45 AM when it repeats the commute. The predicted pattern-of-use can be developed based on this data such that the remote server 102 can estimate that each weeknight, the first vehicle 106 will be available as a computational resource from approximately 6:00 PM until 7:45 AM the next morning.

In some embodiments, the remote server 102 may utilize information from the calendar module 128 to predict the pattern-of-use. In some embodiments, the calendar module 128 may interface with a mobile or web-based application, such as calendar, schedule, email, or other applications, to glean information about a user's schedule or the vehicle's schedule. For example, a user of the first vehicle 106 may record in his or her web-based calendar that soccer practice is scheduled for 6:00 PM on Wednesday evening. The calendar module 128 may upload this information to the remote server 102 so that it may utilize such information to prevent the remote server 102 from attempting to use the first vehicle 106 to process data during the scheduled time. In some embodiments, the remote server 102 may compile scheduling information from the first vehicle 106 over a period of weeks such that recurring events, such as weekly soccer practice or weekly trips to the grocery store are expected events. It is to be understood that the particular periods used herein (e.g., "weekly") are example periods and that any temporal period is contemplated.

Additionally, the remote server 102 may maintain a dataset of unscheduled or unusual trips in order to generate a deviation prediction based on the likelihood of the vehicle to deviate from a predicted pattern-of-use at any given time. For example, a user may be most likely to deviate from a predicted pattern-of-use on a Wednesday evening. That is, the schedule of the first vehicle 106 may be most difficult to predict on Wednesday evening. The deviation prediction may be used, for example, to prioritize which computational tasks are assigned to a given vehicle. For example, if the remote server 102 calculates that the first vehicle 106 is likely to deviate from its predicted pattern-of-use (i.e., it has a high deviation prediction number) but the second vehicle 108 is less likely to deviate from its predicted pattern-of-use (i.e., it has a lower deviation prediction than the first vehicle 106), the remote server 102 may assign a computational task to the second vehicle 108 based on the deviation prediction.

At step 308, the remote server 102 may determine a predicted current use based on the predicted pattern-of-use and other information. The predicted current use is a prediction of the current usability of the vehicle for computational tasks based on the predicted pattern-of-use and one or more other factors. For example, the predicted current use may be determined based on the predicted pattern-of-use, the current location, speed, or acceleration of the vehicle, the active or inactive status of one or more systems on the vehicle, and other various factors. As shown in FIG. 1, the first vehicle 106 may have a current location of the garage 140. This may be determinable based on an output of the navigation module 126. The current location of the first vehicle 106 may be used to ascertain that the first vehicle 106 is in the garage 140. This location may be compared against the predicted pattern-of-use. If the predicted pattern-of-use predicts that the first vehicle 106 will be in the garage 140 for another six hours and if the location of the first vehicle 106 is in the garage 140 as expected, the predicted current use may be verified. Accordingly, the remote server 102 may assign a computational task that may take up to six hours to the first vehicle 106. During the time the first vehicle 106 is in the garage 140 and performing computational tasks and/or preparing to perform computational tasks, the appropriate systems for performing the computational tasks described herein are energized such that the first vehicle 106 can perform the computational tasks. Such systems may include, for example, the ECU 112, the network interface hardware 122, the battery module 127, etc.

In some embodiments, the predicted current use may be calculated based on input from one or more systems of the vehicle. Referring to FIGS. 1 and 2, the third vehicle 110 may include an adaptive cruise control module 124. In some embodiments, operating the adaptive cruise control module 124 may require a significant portion of the computational resources of a vehicle. Accordingly, the computational resources remaining to perform tasks allocated by the remote server 102 may be limited. In such a scenario, the third vehicle 110 may send data to the remote server 102 that it is operating the adaptive cruise control module 124 and the remote server 102 may generate a predicted current use of the third vehicle 110 such that difficult or relatively processor-intensive computational tasks are not assigned to the third vehicle 110 while the adaptive cruise control module 124 is in operation.

At step 310, the remote server 102 may determine whether a vehicle has sufficient computational resources to perform a task based on the predicted pattern-of-use and the predicted current use as discussed above. The remote server 102 may maintain a database of the different computational resources for various makes and models of vehicles (e.g., a lookup table) or may include data for specific vehicles based on a vehicle identification (e.g., a VIN, a network session identifier, etc.). In some embodiments, the remote server 102 may communicatively couple with a vehicle and request information about the computational resources available on the vehicle. The remote server 102 may store this information in the memory module 138 and may develop an expected resource list of available computational resources. In some embodiments, this information is sent from the remote server 102 to the grid computing network 104 and the grid computing network 104 may assign computational tasks to the remote server 102 or other remote servers based on the expected resource list.

If the vehicle has sufficient computational resources based on the predicted pattern-of-use and the predicted current use (yes at step 310), the remote server 102 may assign the computational task to the vehicle at step 312 (no at step 310). If the vehicle does not have sufficient computational resources to perform a task, the remote server 102 may return to step 304 where it may determine another computational task and may reperform steps 304-310 as described above. The remote server 102 may continuously repeat steps 304-310 as it establishes new connections with new vehicles in its communications proximity and/or generates new computational tasks.

In some embodiments, to allocate a particular computational task, the remote server 102 may send a request to the vehicle to accept the particular task. In other embodiments, a user of a vehicle may accept or acknowledge an agreement with an entity operating the grid computing network 104 and/or the remote server 102 that permits the assignment of tasks without requiring each individual task to be accepted or denied (e.g., a blanket policy). The remote server 102 may assign the computational task and the vehicle may begin to process the data associated with the task.

The task assigned to any particular vehicle may be based on the available computational resources of a particular vehicle, the current and predicted vehicle status, and the nature of a task, whether a potential computational resource (e.g., a vehicle) will have sufficient time to complete an assigned task. As described above, some computational tasks may be perpetual and incremental (e.g., mining cryptocurrency) such that so long as the vehicle has sufficient time to establish a network connection and perform any amount of data processing, even a relatively small amount of processing may be worthwhile. In such a case, the remote server 102 may be very likely to allocate the computational task to the vehicle. However, in the case of finite computational or tasks in which an entire task must be started and completed by the same computational resource, the amount of time required to process data and to complete a task may be relevant. Accordingly, the remote server 102 may forego assigning a task to a computational resource without sufficient time or computational power. In some embodiments, the currently available computational resources may be expressed as a percentage of the total available computational resources. In some embodiments, the currently available computational resources may be expressed as a specific computational capacity.

For example, if a vehicle visits a gas station every Tuesday morning at 7 AM as determined by the navigation module 126, the calendar module 128 may determine that the next Tuesday morning at 7 AM the vehicle will be in use and at the gas station to receive fuel. The vehicle may update the remote server 102 with its expected use on Tuesday morning and the remote server 102 may know that the vehicle will not be available as a computational resource on Tuesday at 7 AM. In some embodiments, the calendar module 128 may incentivize a user or users of a vehicle to maintain their personal calendar or the calendar of a vehicle up to date so as to improve the prediction of expected computational resources.

In some embodiments, the remote server 102 may assign work randomly to multiple nodes (presumably with different owners) and check that at least two distinct nodes report the same answer for a given work unit. A discrepancy between the nodes may identify malfunctioning or malicious nodes. In some embodiments, the remote server 102 may require authentication of each of the nodes before the node can communicatively couple to the grid computing network 104 to share completed computational tasks.

Figure 4:
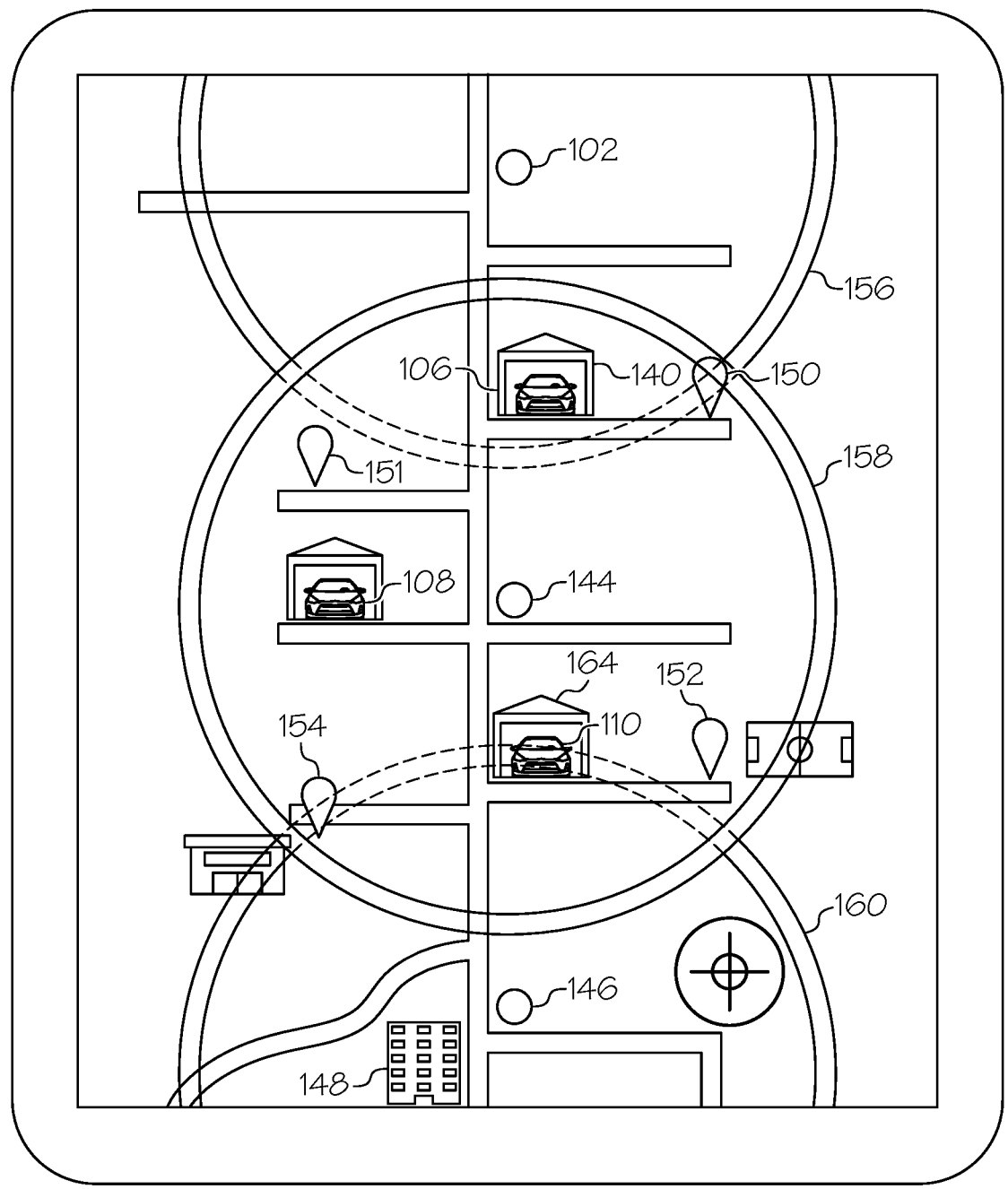
FIG. 4 depicts an exemplary scenario in which a remote server distributes computational tasks to multiple nodes, according to one or more embodiments shown and described herein.

Referring now to FIGS. 1 and 4, one exemplary scenario of using predictive analytics to determine expected use patterns of vehicles to recapture under-utilized computational resources of vehicles is described. FIG. 4 depicts a first vehicle 106 in a garage 140. The garage 140 is inside a communications radius 156 of a remote server 102 and a communications radius 158 of a second remote server 144. The first vehicle 106 commutes routinely (e.g., Monday-Friday from 7 AM to 5 PM) to an office building 148 that is within a communications radius 160 of a third remote server 146. The remote server 102, the second remote server 144, and the third remote server 146 are communicatively coupled to a grid network, such as the grid computing network 104.

When the first vehicle 106 is within the communications radius 156 of the remote server 102, the first vehicle 106 may establish a connection with the remote server 102. The remote server 102 may collect data related to the first vehicle 106 while it is in the communications radius 156. For example, the first vehicle 106 may send schedule data to the remote server 102. Schedule data may be uploaded to the first vehicle 106 directly (e.g., using the input/output device 120 (FIG. 2)) or may automatically populate in a calendar module 128 (FIG. 2) of the vehicle via, for example, a connection with a smart device 162. In some embodiments, a navigation module 126 (FIG. 2) of the first vehicle 106 may be used to collect data relating to the locations and durations of travel of the first vehicle 106. This data may transfer on-demand or may automatically transfer to the remote server 102 when the first vehicle 106 is communicatively coupled to the remote server 102. In some embodiments, a user of the first vehicle 106 may be prompted with a question as to whether the user is willing to share travel location and duration information with the remote server 102, for example, in the form of a question on the display 118 (FIG. 2) of the first vehicle 106.

As the remote server 102 gathers sufficient information regarding the duration and location of travel of the first vehicle 106, the remote server 102 may begin to develop a pattern-of-use of the first vehicle 106. That is, the remote server 102 may collect and record travel location and duration information to make future predictions regarding expected travel location and duration. The remote server 102 may then predict that on Monday morning at approximately 7:00 AM, the first vehicle 106 will leave the garage 140 and will arrive at the office building 148 at approximately 7:25 AM and will remain at the office building 148 until approximately 5:30 PM when the first vehicle 106 will return home. The remote server 102 may collect additional information, for example, that each Tuesday evening at 5:45 PM the first vehicle 106 will arrive at a soccer field 152 and will remain at the soccer field 152 until 7:30 PM, after which the first vehicle 106 will return to the garage 140. In some embodiments, the remote server 102 may determine that the first vehicle 106 arrives at a dog grooming business 154 at 6:30 AM on the first Wednesday of every month. Thus, the remote server 102 can begin to establish where the first vehicle 106 will be at particular times with respect to the time of day, the day of the week, or particular days of the month. This schedule of events may be used to determine a predicted pattern-of-use.

In some embodiments, a user may update his or her smart device 162 with calendar items. These calendar items may be sent from the smart device 162 to the first vehicle 106 and used to inform the predicted pattern-of-use. In further embodiments, a smart device 162 may include a task list with pending or completed tasks. The pending or completed task list may be associated with saved data corresponding to locations in a navigation module, such as the navigation module 126 of FIG. 2, and may be used to inform the predicted pattern-of-use of the first vehicle 106.

In addition to the predicted pattern-of-use, the remote server 102 may predict a current use of the vehicle. In some embodiments, the predicted current use may be determined based on the predicted pattern-of-use and one or more other criteria, for example, a current location of the first vehicle 106. For example, the remote server 102 may predict based on the predicted pattern-of-use that the first vehicle 106 is in the garage 140. For example, on a Monday night at 8:00 PM, the predicted pattern-of-use of the first vehicle 106 may indicate that the first vehicle 106 is predicted to be in the garage 140. However, if the first vehicle 106 is not within the communications radius 156 of the remote server 102, the remote server 102 may not be able to predict a current use of the first vehicle 106 or may predict a different current use of the first vehicle 106 than that predicted by the pattern-of-use. Accordingly, the remote server 102 may not send computational tasks to the first vehicle 106.

In some embodiments, the remote server 102 may be in communication with other remote servers (e.g., the second remote server 144 and the third remote server 146) which may also be used to collect data on the first vehicle 106. The various remote servers may be connected via the grid computing network 104. To continue the scenario above, if the first vehicle 106 is still located at the office building 148 at 8:00 PM on Monday night and has established a communicative connection with the third remote server 146, the third remote server 146 may send this information to the remote server 102 such that the remote server 102 can update its predicted pattern-of-use and/or its predicted current use for the first vehicle 106. In some embodiments, various remote servers may be used to partially assign computational tasks to the first vehicle 106 at various times of the day. For example, the third remote server 146 may assign a portion of a computational task to the first vehicle 106 that may take the first vehicle 106 approximately eight hours to accomplish if the first vehicle 106 is expected to be at work for approximately eight hours. The remote server 102 may assign additional portions of the computational task to the first vehicle 106 when the first vehicle 106 returns to the garage 140 at the end of the work day.

Still referring to FIGS. 1 and 4, in some embodiments, one or more of the vehicles may operate as a rideshare vehicle. For example, the third vehicle 110 may operate as a rideshare vehicle. The third vehicle 110 may proceed to a pickup location 151 to pickup a passenger and proceed to drive the passenger to a dropoff location 150. During operation, the third vehicle 110 may travel from a garage 164 to the pickup location 151 to the dropoff location 150. The third vehicle 110 may travel in between multiple communications radii and establish connections with multiple remote servers (e.g., the remote server 102, the second remote server 144, and the third remote server 146). During operation, the third vehicle 110 may receive computational tasks from the second remote server 144 while it is operating within the communications radius 158. If the third vehicle 110 determines that it has sufficient computational resources to perform computational tasks in spite of running a ride sharing application, the third vehicle 110 may continue to be assigned computational tasks and may continue to perform assigned computational tasks even while it is running a ride sharing application. In some embodiments, the third vehicle 110 may update the second remote server 144 with its rideshare agenda such that the second remote server 144 can access the locations and times of rideshare travel of the third vehicle 110 such that the second remote server 144 can accurately predict a pattern-of-use and a current use of the third vehicle 110.

It should now be understood that a distributed computing network may include a remote server that is communicatively coupled to multiple nodes. Each node may be a vehicle. The remote server may allocate computational tasks to each of the multiple nodes based on various criteria. For example, the remote server may allocate computational tasks to the nodes based on expected computational resource utilization of the node. In some embodiments, the expected computational resource utilization may be determined based on a predicted pattern-of-use of the vehicle and a predicted current use of the vehicle. The remote server may allocate computational tasks based on the predicted pattern-of-use and the predicted current use to accomplish computational tasks assigned by the grid network efficiently to recapture underutilized vehicle-based computational resources.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A distributed computing network comprising:
one or more vehicles, each vehicle configured to act as a node in the distributed computing network; and
a remote server comprising a processor and a memory module storing one or more non-transitory processor-readable instructions that when executed by the processor cause the remote server to:
establish a data connection with the one or more vehicles;
predict a pattern-of-use of the one or more vehicles;
determine a predicted current use of the one or more vehicles based on a current status of the one or more vehicles; and
allocate a computational task to the one or more vehicles based on the predicted pattern-of-use and the predicted current use,
wherein the predicted current use of the one or more vehicles is determined based on a period of time the one or more vehicles is expected to remain stationary at an expected location, and
wherein the remote server assigns a portion of the computational task proportional to the period of time the vehicle is expected to remain stationary at the expected location.

2. The distributed computing network of claim 1, wherein the current status of the one or more vehicles includes a current location of the one or more vehicles.

3. The distributed computing network of claim 1, wherein the predicted current use of the one or more vehicles is determined based on a status of one or more critical systems of the one or more vehicles.

4. The distributed computing network of claim 3, wherein the one or more critical systems include an adaptive cruise control system.

5. The distributed computing network of claim 3, wherein:
the one or more critical systems include a battery module that monitors a battery voltage and use rate of a vehicle battery; and
the remote server allocates computational tasks to the one or more vehicles based on the battery voltage and use rate.

6. The distributed computing network of claim 1, wherein the computational task includes mining cryptocurrency.

7. The distributed computing network of claim 1, wherein at least one of the one or more vehicles is a ride-share vehicle and the pattern-of-use is predicted based on reservation information of the ride-share vehicle.

8. The distributed computing network of claim 1, wherein the current status of the one or more vehicles includes current speed or acceleration of the one or more vehicles.

9. The distributed computing network of claim 1, wherein users of the one or more vehicles receive an incentive to perform computational tasks allocated by the remote server.

10. The distributed computing network of claim 1, wherein the expected location is determined by comparing the actual location of the vehicle against the predicted pattern-of-use.

11. The distributed computing network of claim 1, wherein the node includes a plurality of nodes each associated with a respective vehicle, and the remote server randomly assigns work to the nodes to determine a discrepancy between the nodes based on whether one of the nodes reports an answer that is not the same with the other node.

12. The distributed computing network of claim 1, wherein the one or more vehicles operate as rideshare vehicles, the remote server receives a rideshare agenda including a location and time of rideshare travel of each rideshare vehicle, and the pattern-of-use and the current use are predicted based on the rideshare agenda.

13. A vehicle configured to act as a node in a distributed computing network, the vehicle comprising:
network interface hardware;
a processor; and
a memory module storing non-transitory processor-readable instructions that when executed by the processor cause the vehicle to:
establish a communicative connection with a remote server;
predict a pattern-of-use;
predict a current use based on a current status of the vehicle;
transmit the predicted pattern-of-use and the predicted current use to the remote server; and
receive a computational task from the remote server based on the predicted pattern-of-use and the predicted current use,
wherein the predicted current use of the vehicle is determined based on a period of time the vehicle is expected to remain stationary at an expected location, and
wherein the remote server assigns a portion of the computational task proportional to the period of time the vehicle is expected to remain stationary at the expected location.

14. The vehicle of claim 13, wherein the non-transient processor-readable instructions further cause the vehicle to:
identify the current status of the vehicle including a current location of the vehicle; and
transmit the current location of the vehicle to the remote server.

15. The vehicle of claim 13, wherein the current use is predicted based on the status of one or more critical systems of the vehicle.

16. The vehicle of claim 15, wherein the one or more critical systems include an adaptive cruise control system of the vehicle.

17. The vehicle of claim 15, wherein:
the one or more critical systems include a battery system that monitors a battery voltage and use rate of a vehicle battery; and
the vehicle receives computational tasks based on the battery voltage and use rate.

18. The vehicle of claim 13, wherein the computational task includes mining cryptocurrency.

19. The vehicle of claim 13, wherein the vehicle is a ride-share vehicle and the pattern-of-use is predicted based on reservation information.

20. The vehicle of claim 13, wherein the vehicle accepts one or more incentives in exchange for performing computational tasks.

21. A method of allocating computational tasks in a distributed computing network comprising a remote server communicatively coupled between a grid computing network and one or more vehicles acting as nodes in the network, the method comprising:
- establishing, by the remote server, a data connection with the one or more vehicles;
- predicting, by the remote server, a pattern-of-use of the one or more vehicles;
- predicting, by the remote server, a current use of the one or more vehicles based on a current status of the one or more vehicles; and
- allocating, by the remote server, a computational task to the one or more vehicles based on the predicted pattern-of-use and the predicted current use,
- wherein the predicted current use of the one or more vehicles is determined based on a period of time the one or more vehicles is expected to remain stationary at an expected location, and
- wherein the remote server assigns a portion of the computational task proportional to the period of time the vehicle is expected to remain stationary at the expected location.

22. The method of claim 21, wherein users of the one or more vehicles receive an incentive to perform the allocated computational task.

23. The method of claim 21, wherein the computational task includes mining cryptocurrency.

* * * * *